United States Patent
Le Louarn et al.

(10) Patent No.: US 8,328,136 B2
(45) Date of Patent: Dec. 11, 2012

(54) AIRCRAFT APPLYING MULTISYSTEM CONNECTION DEVICES

(75) Inventors: Amelie Le Louarn, Tournefeuille (FR); Pascal Thalin, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 431 days.

(21) Appl. No.: 12/598,210

(22) PCT Filed: Apr. 29, 2008

(86) PCT No.: PCT/EP2008/055223
§ 371 (c)(1),
(2), (4) Date: Oct. 30, 2009

(87) PCT Pub. No.: WO2008/135449
PCT Pub. Date: Nov. 13, 2008

(65) Prior Publication Data
US 2010/0116939 A1 May 13, 2010

(30) Foreign Application Priority Data
May 4, 2007 (FR) ...................................... 07 54868

(51) Int. Cl.
*B64D 11/00* (2006.01)
*B64D 13/00* (2006.01)

(52) U.S. Cl. ..................... 244/118.5; 251/142; 439/192; 439/194

(58) Field of Classification Search .................. 244/131; 251/142, 149.1; 439/191, 192, 194
See application file for complete search history.

(56) References Cited

U.S. PATENT DOCUMENTS

| | | | | |
|---|---|---|---|---|
| 2,864,628 A | * | 12/1958 | Edleson | 137/614.04 |
| 3,217,282 A | | 11/1965 | Chevalier et al. | |
| 3,673,541 A | * | 6/1972 | Volinskie | 439/195 |
| 4,391,017 A | * | 7/1983 | Bruensicke | 15/313 |
| 4,913,657 A | | 4/1990 | Naito et al. | |
| 5,083,727 A | * | 1/1992 | Pompei et al. | 244/118.6 |
| 5,658,159 A | | 8/1997 | Gardner et al. | |
| 6,398,586 B1 | | 6/2002 | Muzslay | |
| 6,471,530 B1 | | 10/2002 | Gimbatti et al. | |
| 7,931,047 B2 | * | 4/2011 | Gonnsen et al. | 137/899.2 |
| 2003/0010382 A1 | | 1/2003 | Meckes et al. | |
| 2004/0026567 A1 | | 2/2004 | Emmerling | |
| 2006/0038074 A1 | * | 2/2006 | Buhr | 244/129.1 |
| 2006/0169283 A1 | | 8/2006 | Schaeffer, Jr. et al. | |
| 2007/0056934 A1 | | 3/2007 | Hsu | |
| 2007/0246048 A1 | | 10/2007 | Schaeffer, Jr. et al. | |
| 2009/0283641 A1 | * | 11/2009 | De Buhr | 244/131 |
| 2010/0015830 A1 | * | 1/2010 | Simeon et al. | 439/191 |

FOREIGN PATENT DOCUMENTS

| | | |
|---|---|---|
| DE | 37 26 778 | 3/1989 |
| DE | 298 20 933 | 3/2000 |
| DE | 199 16 984 | 7/2000 |
| EP | 0 337 055 | 10/1989 |
| FR | 2 601 518 | 1/1988 |

* cited by examiner

*Primary Examiner* — Tien Dinh
*Assistant Examiner* — Michael A Fabula
(74) *Attorney, Agent, or Firm* — Oblon, Spivak, McClelland, Maier & Neustadt, L.L.P.

(57) ABSTRACT

An aircraft including a cabin, on at least one wall of which are attached first portions of plural multisystem connection devices, each device including a male portion or plug and a female portion or socket capable of fitting into each other. Each male and female portion includes: a first mechanism connecting to a liquid or gas supply of the aircraft; and a second mechanism connecting to a supply of electricity and/or electric signals of the aircraft.

5 Claims, 8 Drawing Sheets

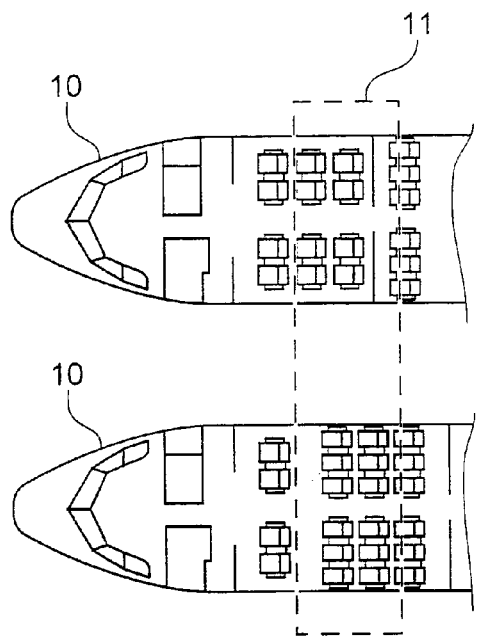
FIG.1A PRIOR ART
FIG.1B PRIOR ART
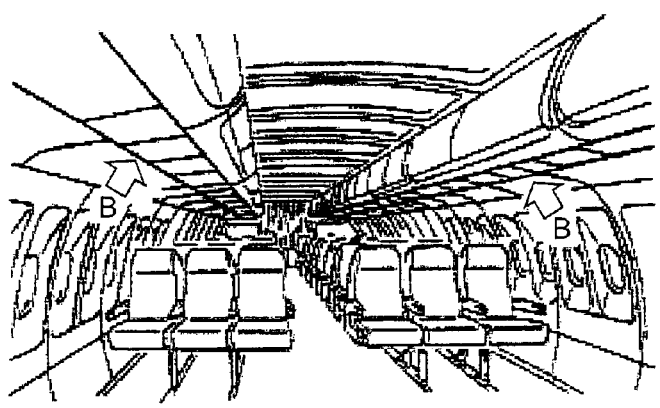
FIG.2A PRIOR ART
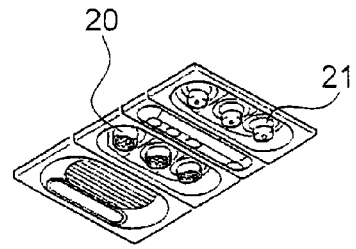
FIG.2B PRIOR ART

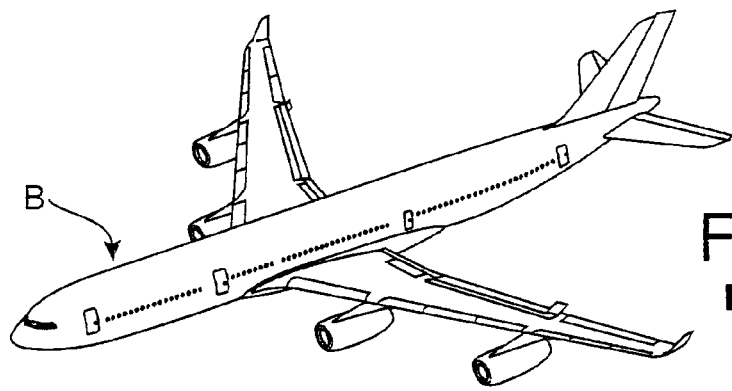
FIG.3A
PRIOR ART
FIG.3B
PRIOR ART
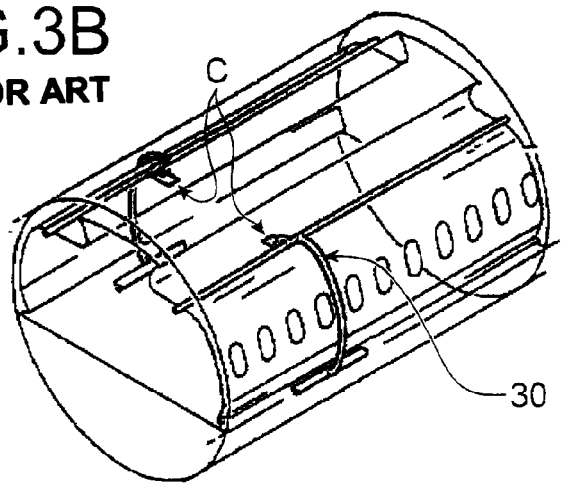
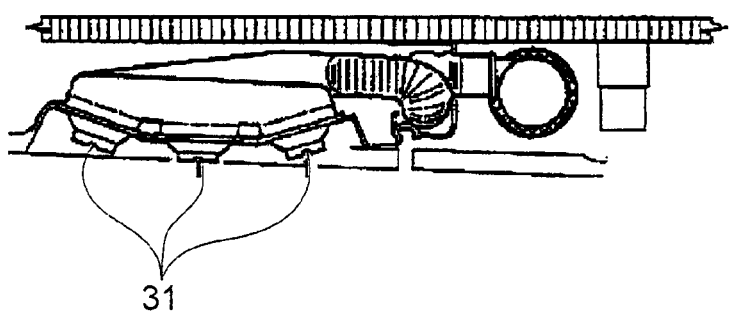
FIG.3C
PRIOR ART

AIRCRAFT APPLYING MULTISYSTEM CONNECTION DEVICES

TECHNICAL FIELD

The invention relates to an aircraft applying multisystem connection devices.

In the following, in order to simplify the description, an aircraft of the airplane type is considered.

STATE OF THE PRIOR ART

Within the scope of development of new airplanes, airlines ask aircraft manufacturers to provide them with airplanes with a more flexible cabin. Airlines actually wish to have the possibility of reconfiguring the cabin layout of their airplanes within increasingly shorter times in order to immobilize these airplanes as less as possible. Their goal is to result in total reconfiguration of the cabin of an airplane in a cargo zone which is very rapid. With this perspective, the idea of the invention is to adapt rapid installation concepts among the distributed systems (air, water, electricity, oxygen . . . ) and the packages to be installed in the cabin (galleys, seats, containers, . . . ) in order to facilitate this flexibility of the cabin.

The technical problem to be solved is to allow installation of these systems in a:
  more flexible,
  more rapid,
  simpler, and
  more integrated way.

If an exemplary modification of the interior of the cabin of an airplane is considered as illustrated in FIGS. 1A and 1B, wherein the configuration in the front of the airplane 10, in the area 11, has been modified between the illustration of FIG. 1A and that of FIG. 1B by replacing series of two seats with series of three seats, for example in order to increase the surface area allocated to the economy class relatively to the business class. Such a modification involves a reduction in the distance between two successive rows of seats, and therefore modifications at the level of the systems for supplying air, electricity . . . to the passengers.

It is therefore necessary to contemplate interfaces which are available all along the cabin of the aircraft in order to allow all the possible configurations, without having to modify the routings of the different distributed systems.

In the example considered above of bringing the seats closer, it is necessary to provide air for the diffusers 21 and electricity for the individual lightings 20 and the LCD (Liquid Crystal Display) screens for each passengers, as illustrated in FIGS. 2A and 2B.

As illustrated in FIGS. 3A, 3B and 3C, the air outlet system (tubing 30) arrives above the hat racks so as to be connected at the air diffusers 31.

As regards distribution of electricity, there are electric connections through the floor, for the LCD screens for example installed on the seats, through the hat racks for the individual lighting.

As regards oxygen to be provided to the oxygen masks in the case of depressurization, it is possible to use:
  either pyrotechnic cartridges 41: in the case of depressurization, as illustrated in FIG. 4, the oxygen masks 40 fall. Each passenger pulls a mask 40 in a quick move in order to trigger off a chemical reaction inside the corresponding cartridge 41 which provides oxygen. In this case, it is necessary to provide an electric signal for releasing each oxygen mask in the case of depressurization,
  or oxygen gas cylinders 50 as illustrated in FIG. 5A or devices of the low box type : with both of these types of equipment, oxygen has to be redistributed through pipings 51, as illustrated in FIG. 5B, as far as the masks and therefore connections for oxygen in addition to the electric signal have to be provided at the cabin.

In the case of the galleys (washstand or kitchen furniture intended for preparing food for passengers and containing trolleys for the food), water, electricity and cooling air notably have to be provided.

The installations of these different systems are independent of each other, with segregation between the air supply and the electric cables for example. Once the airline has bought the airplane, the definition of the systems for supplying the cabin is set. Any modification of the cabin layout requires a long and costly process which necessitates re-studies, certification.

One of the technical problems to be solved by the airplane designers is therefore to make available to the cabin layout interfaces in a sufficiently regular way along the interior wall of the cabin of the airplane in order to connect the different systems while allowing modularity of the cabin, i.e. a certain number of configurations for laying out the latter. Solving such a technical problem therefore requires for installing the systems flexibility and fast simplified connections without any risks of error.

The object of the invention is therefore to propose multisystem connection devices through which the different systems of the cabin of an airplane may be supplied in a simple, fast, flexible and reliable way without having to redefine neither the whole of the installation, nor the different air, water, electricity systems (lighting, electric signals, LCD screens, or oxygen, if pyrotechnic cartridges are not used).

More specifically, the object of the invention is to propose connection devices which may be used by all the systems to be connected per series of seats, which do not perturb the circuits of the different systems when they are not connected. These connection devices should therefore remain sealed, insulated, (depending on the systems: air, water, electricity systems) in order not to generate leaks when a connection device is not utilized and no piping and/or cable is connected.

DISCLOSURE OF THE INVENTION

The invention relates to an aircraft, for example an airplane, comprising a cabin, over at least one wall of which are attached the first portions of several multisystem connection devices, each device comprising a male portion, or plug, and a female portion, or socket, capable of fitting into each other, characterized in that each male and female portion comprises:
  first means for connection to a liquid and/or gas supply of the aircraft,
  second means for connection to a supply of electricity and/or electric signals of the aircraft.

Advantageously, the first means form a central duct and the second connection means form a cylindrical portion pierced with a central orifice, concentric with the first.

In first and second embodiments a socket comprises:
  a first portion, which forms a base, provided with at least one aperture allowing it to be attached to a gas or water outlet piping, pierced in its centre with an orifice,
  a second portion, which forms a hollow cylindrical part firmly secured to the first portion, perpendicularly to the latter, so that the hollow portion of this cylindrical part communicates with the orifice of the first portion.

Advantageously this second portion comprises three concentric portions which are, starting from the centre:
- a first cylindrical sleeve capable of letting through a liquid or a gas,
- a first cylindrical electric connection portion forming the end of the first electric cables,
- a first locking ring.

Advantageously in these embodiments, a plug comprises three concentric portions, which are, starting from the centre:
- a second cylindrical sleeve capable of letting through a liquid or a gas,
- a second cylindrical electric connection portion forming the end of second electric cables,
- a second locking ring capable of cooperating with the first ring in order to firmly secure the plug and the socket.

Advantageously, the locking ring is a locking ring of the push-pull type or a quarter turn locking system.

Advantageously the hollow cylindrical part of the socket comprises an anti-return valve, which may use a ball and a spring.

Advantageously a protection cap enables each socket to be protected.

In a fourth embodiment, the second connection means comprises means for transmitting high throughput signals, for example electric connections of the quadrax type or optical fibers, with a central orifice.

In a fifth embodiment, each socket and each corresponding plug comprises four apertures allowing:
- an electric connection,
- an air connection,
- a water connection, and
- an oxygen connection, respectively, a segregation being made between the first two connections and the two last ones.

The invention also relates to an aircraft applying connection devices as defined above, the sockets of these devices being accessible on the fittings of the cabin.

The multisystem devices according to the invention provide:
- a gain in time for installing and disassembling systems inside the cabin,
- a reduction of the risks of error or those due to forgetfulness during the configuration of the cabin, the installation of the systems being simpler (a single plug being required instead of two),
- a gain in space,
- a response to technical problems posed by rapid and integrated cabin layout and obtaining the required flexibility.

BRIEF DESCRIPTION OF THE DRAWINGS

FIGS. 1A and 1B illustrate a possible modification of the cabin configuration of an airplane.

FIGS. 2A and 2B illustrate units of the air diffuser, lighting, sound signal kind, made available to the passengers of an airplane.

FIGS. 3A, 3B and 3C illustrate the implantation of passenger air diffusers inside the cabin of an airplane.

DETAILED DISCUSSION OF PARTICULAR EMBODIMENTS

The invention relates to an aircraft comprising a cabin, on at least one wall of which are attached the first portions of multisystem devices, each device comprising a male portion, or plug, and a female portion, or socket, capable of fitting into each other, one of these two portions, for example the socket, being capable of being attached to the cabin fittings of this airplane.

Each of these two male and female portions comprises:
- first means for connecting to a liquid, for example water, and/or gas, for example air or oxygen, supply of the airplane,
- second means for connecting to a supply of electricity and/or electric signals of the airplane.

With the invention, it is possible to install all along the cabin of the airplane, sockets of such multisystem devices which may be modular, which allow simultaneous connection of electricity, air and/or water without any risks of error in the installation. The systems provided with a corresponding plug may then be connected onto these different sockets.

In the case when the systems are not connected, each socket is sealed (as regards water, air, oxygen) or isolated with a protection lid (electricity) in order to avoid any leaks and any risks of accident.

Figure 4:
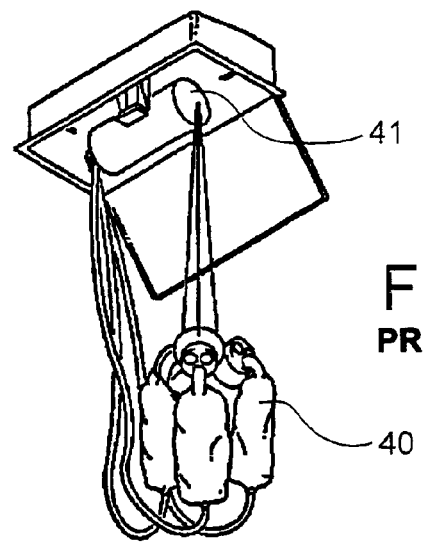
FIG. 4 illustrates a pyrotechnic cartridge with oxygen masks, inside the cabin of an airplane.
Figure 5A:
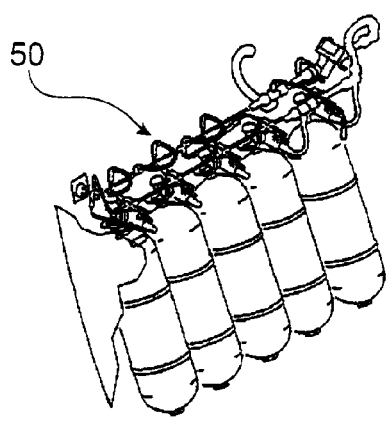
FIGS. 5A and 5B illustrate cylinders for storing oxygen gas as well as for distributing oxygen to the passenger masks.
Figure 5B:
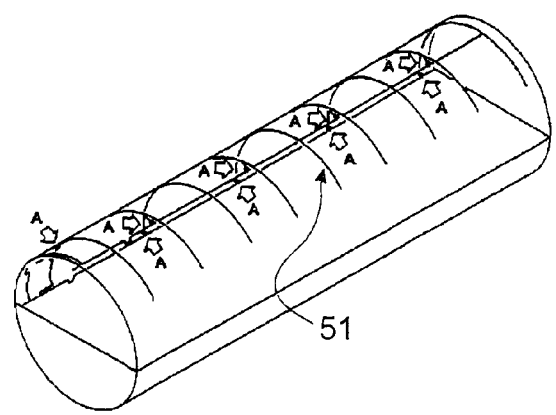
Figure 6:
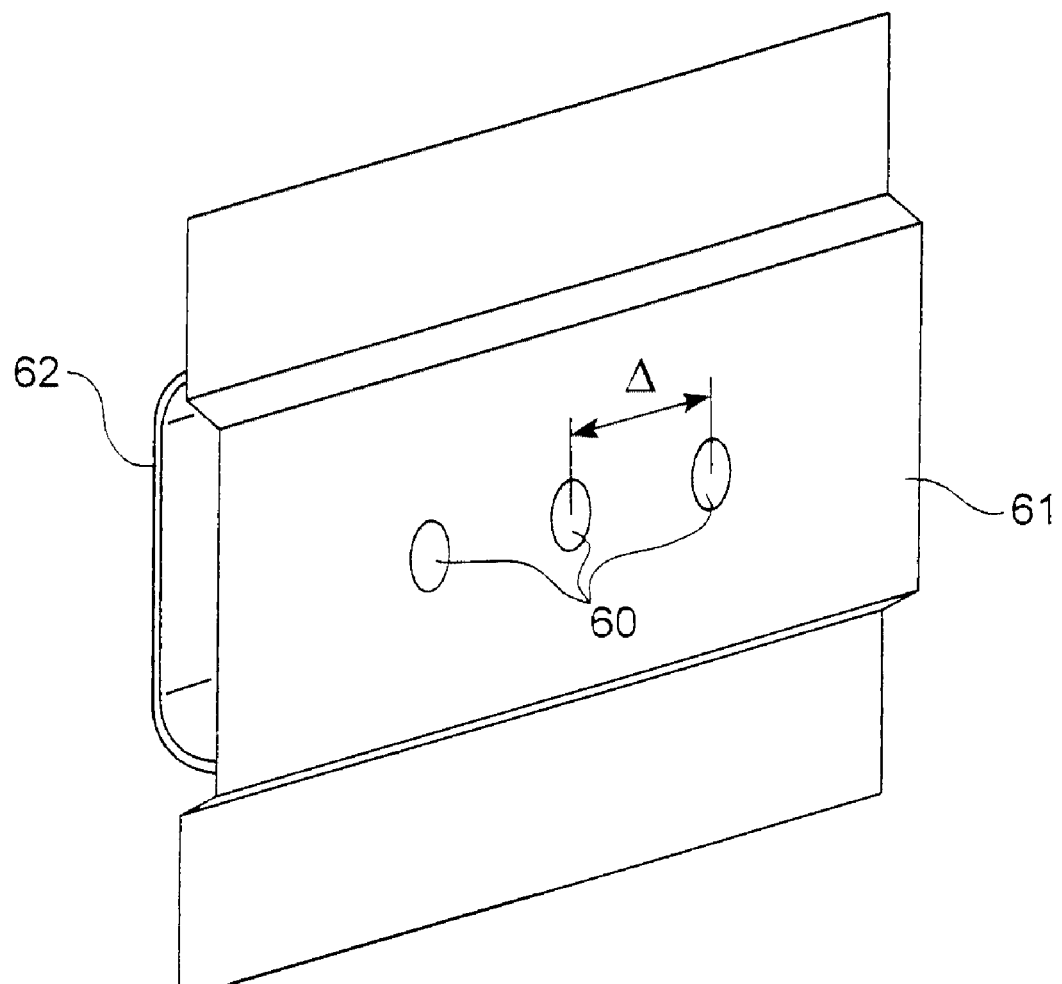
FIG. 6 illustrates a multisystem connection device made available along the interior fittings of the cabin of an airplane according to the invention.

With the device of the invention, it is possible to propose along the internal wall of the cabin of an airplane, sockets spaced apart from each other by a given distance (Δmm), each of these sockets allowing connection of the systems required for a row of seats for example. Thus, as illustrated in FIG. 6, the sockets may be installed in position 60 on a plinth 61 on the side of the cabin, in order to be connected to air piping 62.

Figure 7A:
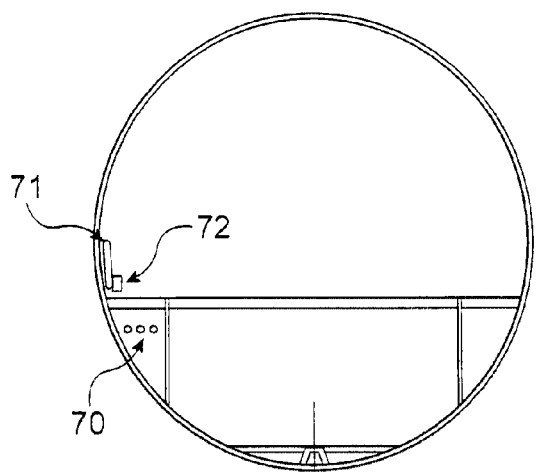
FIGS. 7A, 7B and 7C illustrate alternative localizations of the multisystem connection devices, in a sectional view of an airplane cabin according to the invention.
Figure 7B:
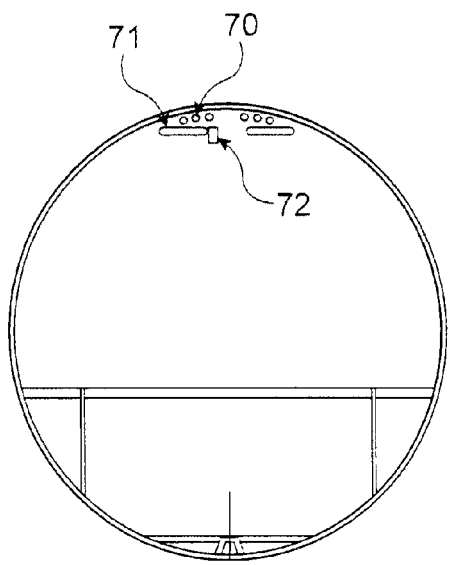
Figure 7C:
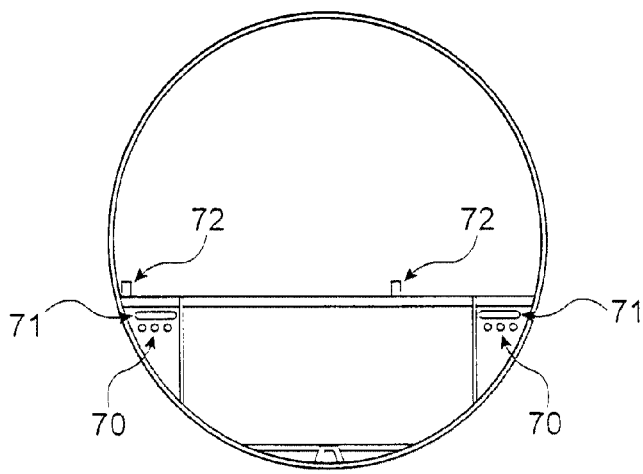

These sockets may also be positioned in different locations along the cabin of the airplane for example at floor level, or at the ceiling depending on the localization of the systems, as illustrated in FIGS. 7A, 7B and 7C. Electric lines 70, air piping 71 located behind the wall or plinth (FIG. 7A), under the ceiling (FIG. 7B) or under the floor (FIG. 7C) and a socket 72, are also illustrated in these figures.

Several embodiments of the device of the invention will be considered below.

First Embodiment of the Device According to the Invention

In this first embodiment, the connection device of the invention allows the connection of both gas, for example air, and electricity or electrical signals, which are two systems which do not require restricting segregations.

Figure 8A:
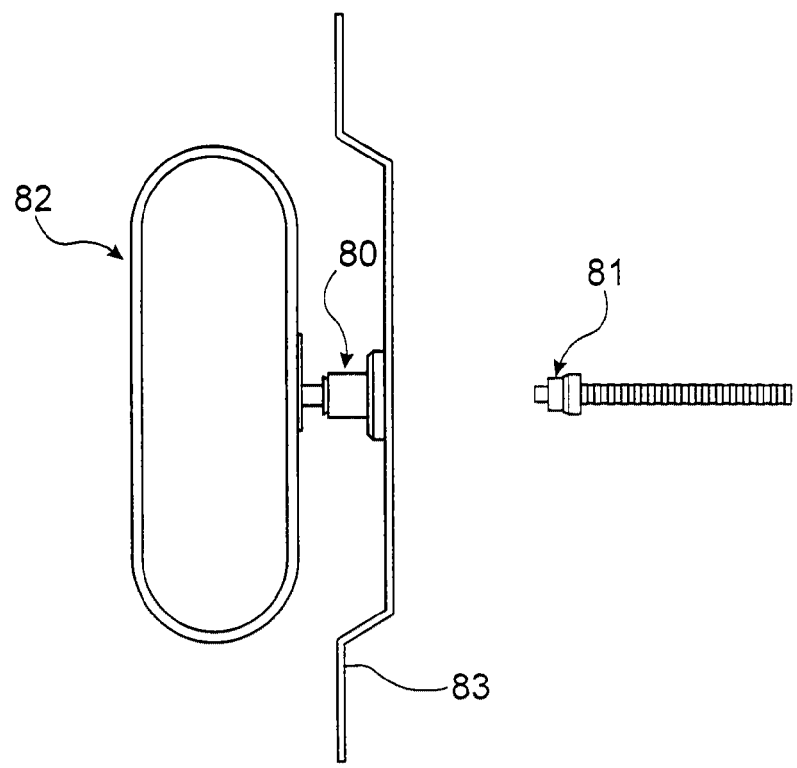
FIGS. 8A and 8B illustrate a first embodiment of the device before and after connection, respectively, according to the invention.
Figure 8B:
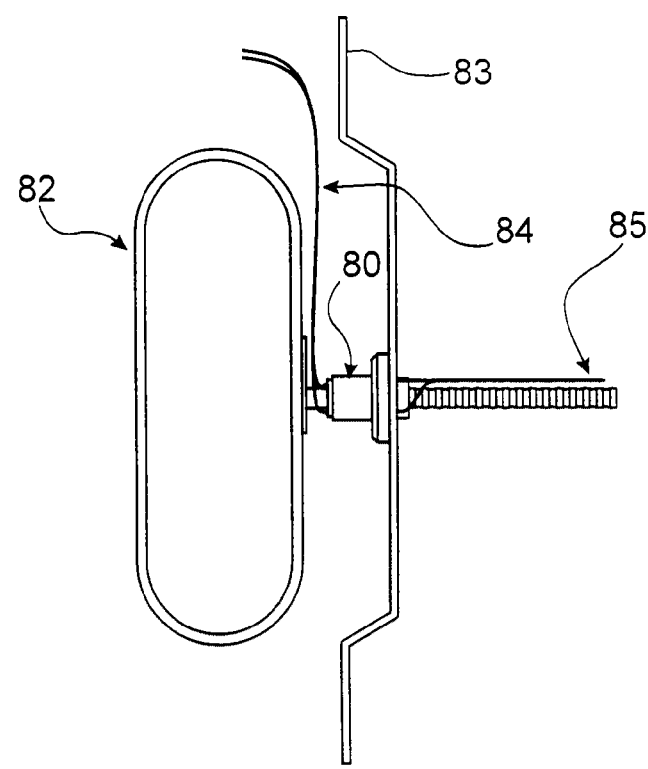

As illustrated in FIGS. 8A and 8B, the connection device then consists of two portions:
- a socket 80 which will be attached between air piping 82 and the cabin fittings 83 (plinth) and which receives the first electric cables 84, a plug 81 connected to the systems of the cabin notably via second electric cables 85 capable of being fitted into the socket 80, as illustrated in FIGS. 8A and 8B, before and after connection of both of these portions 80 and 81.

Figure 9B:
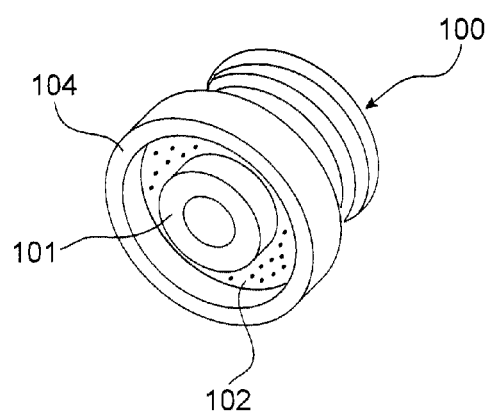
FIGS. 9A-9E illustrate different characteristics of this first embodiment.
Figure 9A:
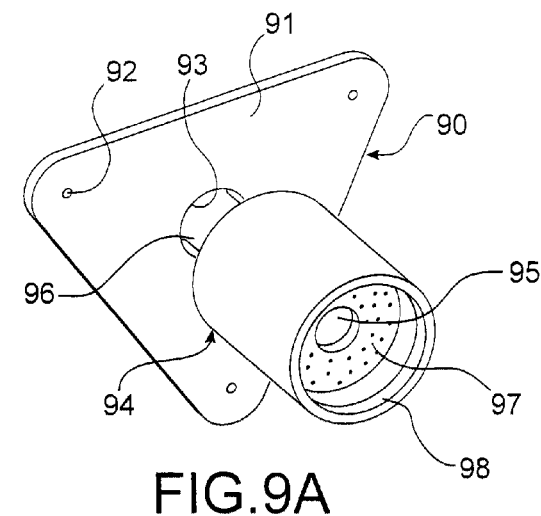

As illustrated in FIG. 9A, a socket 90 comprises:
- a first portion 91 which forms a base, here a triangular base, provided with at least one aperture 92 allowing attachment to gas or water outlet piping pierced in its centre with an orifice 93,
- a second portion 94 which forms a hollow cylindrical part firmly secured to the first portion, perpendicularly to the latter, so that the hollow portion 95 of this part, comprising an anti-return valve 107, communicates with the orifice 93 of the first portion.

This second portion 94 comprises three concentric portions which are, starting from the centre:
- a first cylindrical sleeve 96 capable of letting through liquid or gas,
- a first cylindrical electric connection portion 97 forming the end of first electric cables 99,
- a first rapid locking ring 98, for example of the push-pull type.

Figure 9C:
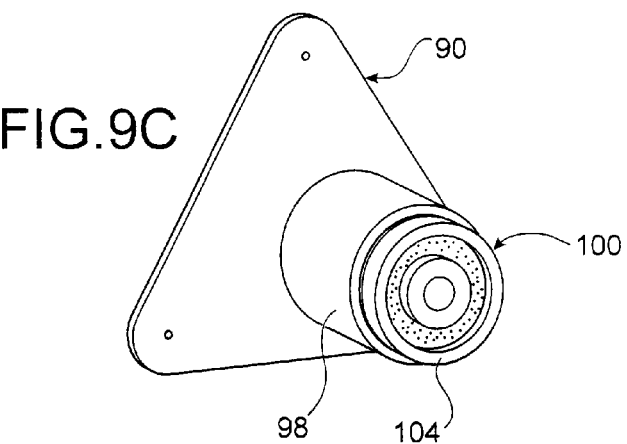

As illustrated in FIG. 9B, a plug 10 also comprises itself three concentric portions which are, starting from the centre:
- a second cylindrical sleeve 101 capable of letting through a liquid or a gas,
- a second cylindrical electric connection portion 102 forming the end of second electric cables 103,
- a second locking ring 104 capable of cooperating with the first locking ring 98 in order to secure the plug 100 and the socket 90, as illustrated in FIG. 9C.

Figure 9D:
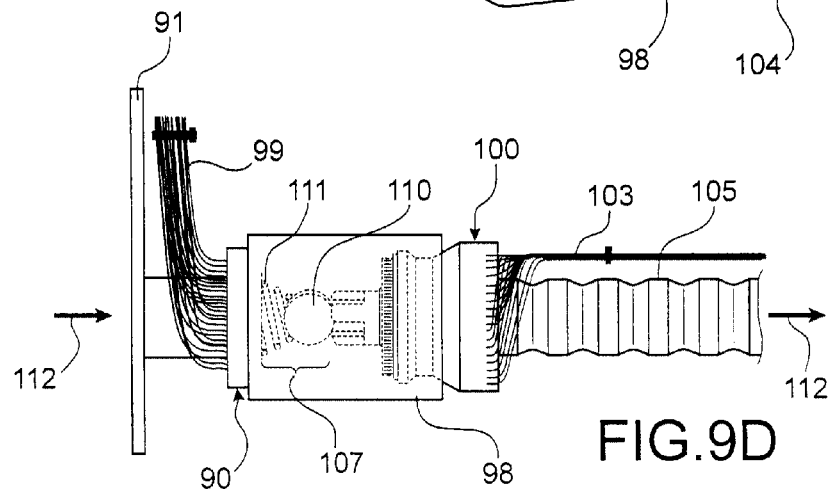

As illustrated in FIG. 9D, the second cylindrical sleeve 102 may advantageously be connected to a ringed tube 105 with which some flexibility may be obtained during the installation of the systems in the cabin and also with which it is possible to avoid transmission of the forces and movements between the components installed in the cabin and the socket.

Figure 9E:
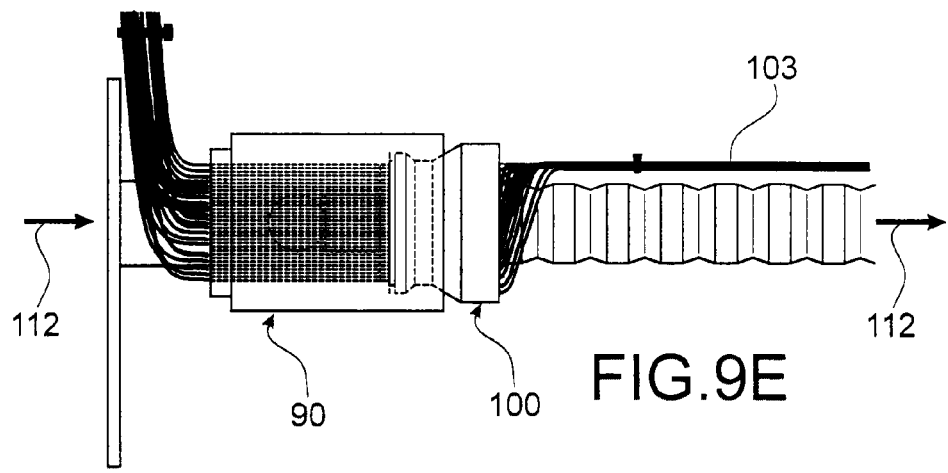

When, as illustrated in FIG. 9E, a plug 100 is connected onto a socket 90, there is matching:
- of the first and second cylindrical sleeve apertures 96 and 101 allowing an inflow of gas 112 into the connected systems,
- of the first and second electric connection portions 97 and 102 allowing the second electric cable 103 of the connected systems to be connected to the first electric cables supplying electricity or electric signals 99.

The socket 90 may be attached onto air-conditioning piping. The electric cables are connected there around the air connection, while taking into account aeronautical electric installation constraints, for example relating to the radius of curvature.

When no plug 100 is connected into the socket 90, an anti-return valve 107 illustrated in FIG. 9D (ball 110+spring 111 system) will block the gas outlet and provide the seal. Indeed, when a plug 100 will become connected to the socket 90, the spring of the anti-return valve 107 is compressed and the ball 110 is pushed back in order to let through the gas. The anti-return valve may be a valve without any gasket in order to avoid any maintenance operation. In this embodiment, the anti-return valve 107 uses a ball 110 and a spring 111 but any other form known to the person skilled in the art may be contemplated for making the device more lightweight.

As regards the electric connection, a protective cap may be installed on each socket 90 in order to prevent condensation from entering the cavities of the socket. Thus, several sockets may be positioned in the cabin of the airplane in order to meet the flexibility of the cabin layout without any risks of air leaks.

This first embodiment has the following advantages:
- Two systems: gas+electricity (and/or electric signals) may be connected at the same time.
- A single locking system is used for two connections.
- There are no risks of connection error or due to forgetfulness; a single plug being used for several systems.
- The seal is ensured for both systems (air, electricity) whether this is in a connected mode or in a disconnected mode.

Second Embodiment of the Device According to the Invention

In the first embodiment, the multisystem connection device allows gas and electricity connections to be made to systems. But it is also possible to contemplate the connection of other systems by allowing modularity at the liquid/electricity connection. This second embodiment also allows a water connection to be made, for application to galleys for example.

In this second embodiment, the corresponding socket 90 and plug 100 have a liquid connection at the centre and an electric connection which may be modular, at the periphery, which may be removed or not depending on the needs. Indeed, for reasons of segregations between systems, it is possible not to leave the electric connections around the water connection.

The advantage of this second embodiment is to allow development of a same multisystem connection device which may be modular, which allows the connection of several systems and which moreover corresponds to existing aeronautical standards.

Third Embodiment of the Device According to the Invention

In this third embodiment of the invention, the rapid push-pull type locking ring is replaced with a fast quarter turn locking system called "Quickdisconnect".

In the case of such a locking system, the movement for locking the ring consists in a rotation around the central axis unlike the push-pull type locking where the movement is performed axially, along the ring. This quarter turn locking has the benefit of a less bulky locking device.

Fourth Embodiment of the Device According to the Invention

In this fourth embodiment of the invention, electric connections are used allowing transmission of high throughput signals of Ethernet networks.

Figure 10A:
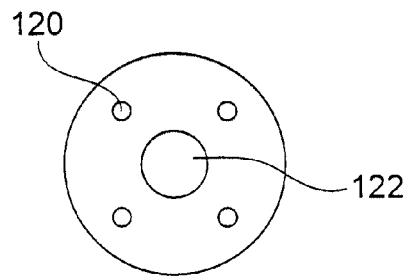
FIGS. 10A and 10B illustrate a sectional view of the socket of the device in a fourth embodiment according to the invention.
Figure 10B:
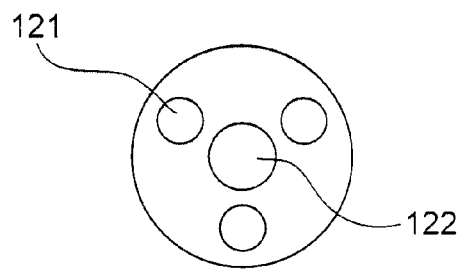

As illustrated in FIGS. 10A and 10B, quadrax type electric connections 120 or optical fiber connections 121, with a central orifice 122 may be used respectively.

Fifth Embodiment of the Device According to the Invention

Figure 11:
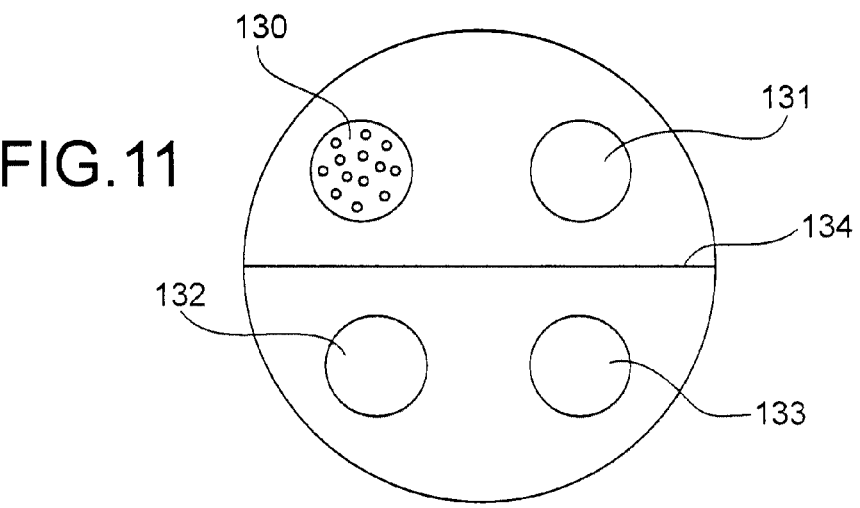
FIG. 11 illustrates a sectional view of the socket of the device in a fifth embodiment according to the invention.

In this fifth embodiment of the invention, as illustrated in FIG. 11, a multisystem connection device is used, the different portions of which are not concentric.

Each socket and each corresponding plug comprise four apertures 130, 131, 132 and 133 respectively providing:
- an electric connection,
- an air connection,
- a water connection, and
- an oxygen connection, a segregation 134 being made between the first two connections and two last ones.

Such an embodiment therefore has the advantage of allowing integration of segregation principles among the different systems.

The invention claimed is:

1. An aircraft comprising:

a cabin including at least one wall; and a plurality of multisystem connection devices, each device including a male portion that is a plug and a corresponding female portion that is a socket such that the plug fits into the socket, wherein when the male portion is attached to the at least one wall of the cabin, the female portion is connected to a system of the cabin, and when the female portion is attached to the at least one wall of the cabin, the male portion is connected to a system of the cabin, wherein each male and female portion includes a central duct that connects to a liquid or gas supply of the aircraft, and an annular portion concentric with the central duct that connects to a supply of electricity and/or electric signals of the aircraft, wherein one of the male and female portions includes a base for attachment to the wall of the cabin, the base including at least one aperture for attachment to a gas or water piping, and an orifice in a center of the base a hollow cylindrical part firmly secured to the base, an axis of the hollow cylindrical part extending perpendicularly to the base such that the hollow cylindrical part communicates with the orifice of the base, and the hollow cylindrical part including three concentric portions, which in order from a center thereof are a cylindrical sleeve via which a gas or liquid passes, a cylindrical electric connection portion forming an end of first electric cables, and a first locking ring, and wherein the corresponding female or male portions includes three concentric portions, which in order from a center thereof are a cylindrical sleeve via which the gas or liquid passes, a cylindrical electric connection portion forming an end of second electric cables, and a second locking ring that cooperates with the first locking ring to firmly secure the male and female portions together.

2. The aircraft according to claim 1, wherein the second locking ring is a locking ring of push-pull type or a quarter turn locking system.

3. The aircraft according to claim 1, wherein either the male or female portion comprises an anti-return valve within the central duct that connects to a liquid or gas supply of the aircraft.

4. The aircraft according to claim 1, wherein the sockets of the devices are accessible on fittings of the cabin.

5. The aircraft according to claim 1, wherein the male and female portions include apertures at back ends thereof through which electrical wire is received.

\* \* \* \* \*